Aug. 31, 1954

M. J. LAUGLE, SR 2,687,792

DETACHABLE CONVEYER ROLLER ASSEMBLY

Filed Oct. 30, 1951

INVENTOR.
MILLARD J. LAUGLE, SR.
BY
Zugelter & Zugelter
Attys.

Patented Aug. 31, 1954

2,687,792

UNITED STATES PATENT OFFICE 2,687,792

DETACHABLE CONVEYER ROLLER ASSEMBLY

Millard J. Laugle, Sr., Batesville, Ind.

Application October 30, 1951, Serial No. 253,911

1 Claim. (Cl. 193—37)

This invention relates to conveyors of the type which are suitable for use in converting an ambulance to a hearse and vice versa. More particularly, the invention relates to a roller assembly that may be detachably mounted on a framework or the floor of an ambulance when converted to a hearse and which can be removed from the floor and stored in a box or container of the vehicle when the vehicle is to be used as an ambulance.

An object of this invention is to provide a roller assembly provided with bearing posts or pedestals so arranged that the rollers may be detachably mounted on a framework or support.

A further object of the invention is to provide a detachable roller assembly that is provided with braking means to prevent free turning of the roller journals in their bearings.

Other objects of the invention will be apparent from the following description taken in conjunction with the accompanying drawing in which.

Figure 1:
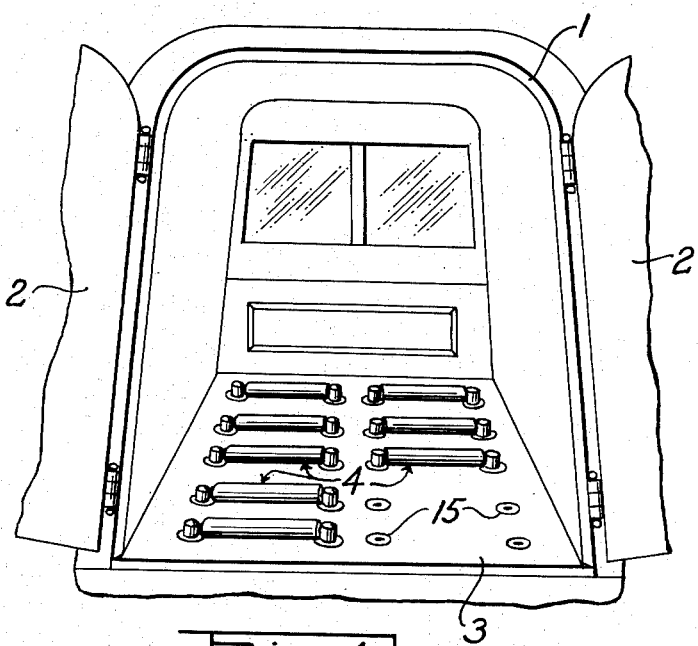
Figure 1 is a rear view of a vehicle such as an ambulance provided with rollers embodying a form of the invention.

In Fig. 1 of the drawing a vehicle 1 such as an ambulance is shown with the rear doors 2 in open position. On the floor 3 of the vehicle are mounted a plurality of roller assemblies 4 arranged and constructed in accordance with an embodiment of the invention.

Figure 2:
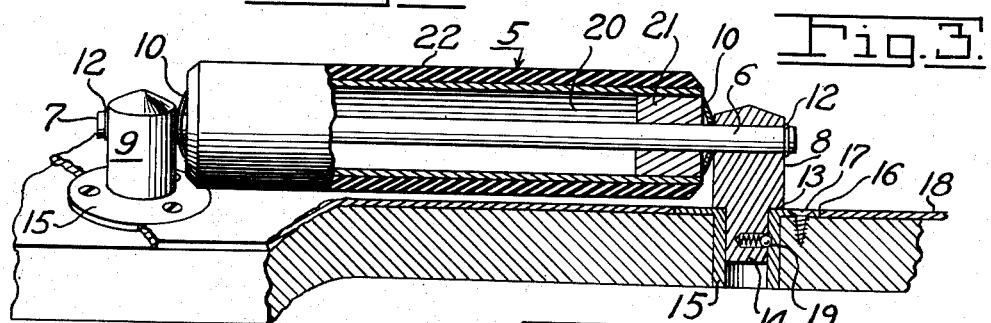
Fig. 2 is an enlarged view partly in section of a roller assembly such as shown in Fig. 1, mounted in place on a framework such as the floor of the vehicle in Fig. 1.

The roller assembly is shown in greater detail in Fig. 2. As there illustrated, the assembly comprises a roller 5 having journals 6 and 7 rotatably mounted in bearing posts or pillars 8 and 9, respectively. Between the ends of roller 5 and the respective posts 8 and 9 a resilient brake means 10 is mounted which prevents free turning of the roller on its journals in the bearing posts.

Figure 3:
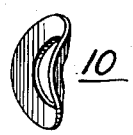
Fig. 3 is a view in perspective of a brake element embodied in the roller assembly of Fig. 2.

The braking means 10 may comprise a washer of spring steel which is bent as shown in Fig. 3 into a troughlike shape. The braking members 10 in the form shown in Fig. 3, are slipped over the journals 6 and 7, after which, the bearing posts are slipped onto the journals. As shown in Fig. 2, the outboard ends of the journals are provided with circumferential grooves for receiving spring locking rings 12. In the assembly a spring locking ring 12 is placed in its groove at one end of one of the journals, following which the other bearing post is pushed inwardly on its journal to deflect the brake members 10 sufficiently to permit placing of the other lock ring 12 in its groove. When both lock rings 12 have been placed as shown in Fig. 2, the braking members 10 are held under compression between and in frictional contact with the posts 8 and 9 and the adjacent ends of the roller.

The lower ends 14 of the bearing posts or pillars 8 and 9 are of reduced diameter so as to form a shoulder 13. The ends 14 are disposed for mounting in sockets 15 set in the supporting framework or floor of the vehicle. As illustrated in Fig. 2, the sockets 15 may be provided with flanges 16 at their upper ends by means of which they may be secured to the floor or framework with screws 17. As shown, the floor may be covered with a covering 18 such as linoleum, for example. At the locations where the sockets 15 are to be placed, the linoleum is cut away to conform to the shape of the flanges 16 whereby when the sockets are placed, the flanges are flush with the floor covering.

The lower ends of the posts or pillars 8 and 9 may be provided with spring pressed locking balls 19 that are received in detents formed in the inside face of socket 15 to prevent accidental removal of the roller assemblies from their supporting framework.

The construction of roller 5 may be of any desired arrangement. As illustrated, roller 5 comprises a cylinder 20 having in the opposite ends thereof plugs 21 (only one of which is shown) that are welded or otherwise secured to the cylinder and a covering 22 of resilient material such as rubber, formed on the outside face of the cylinder 20.

When the roller assemblies 4 are to be mounted on a framework to serve as a conveyor as a means over which an object such as a casket may be conveyed, they are placed in the sockets 15 in the manner above described, and as shown in Fig. 1. When so mounted, the rollers 5 will turn when a turning force is applied to them as when a casket or other object is pulled while resting on them. Turning of the rollers is resisted by the yielding brake members 10 but not to such an extent as to prevent movement of an object over them. However, the yielding brake members 10 exert sufficient braking force to prevent free turning of the rollers in their journal bearings. This feature makes them safe for use in vehicles such as ambulances and hearses in that if a person should step on a roller it will not turn freely and cause the person to fall.

Figure 4:
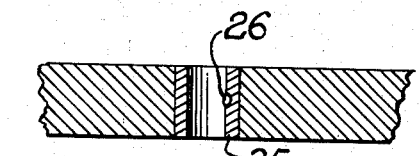
Fig. 4 is a view in section of a modified form of socket for receiving the bearing posts or pillars in which the journals of the roller of Fig. 2, may be mounted.

In Fig. 4 a modified form of socket 25 is illustrated that may be used in place of the socket 15 shown in Fig. 2. As shown in Fig. 4, socket 25 is cylindrical in form and is of such length that when mounted in a framework such as the floor 3 the ends thereof will be flush with the top and bottom surfaces of the floor. No flange is employed with the form shown in Fig. 4. That form is provided with a detent 26 for receiving the spring pressed ball 19 of a journal post such as 8 or 9 of Fig. 2.

Having thus described the invention, it will be apparent to those skilled in this art that the illustrated embodiment of the invention is subject to modification and change in the arrangement and details of construction without departing from either the spirit or the scope of the invention.

Therefore, what I claim as new and desire to secure by Letters Patent is:

A roller assembly comprising a roller having journals at the ends thereof, a journal post for each end of the roller, the posts having bearings for receiving the journals, the ends of the journals extending outboard of the posts, the lower end of each post being smaller than the body of the post and provided with a shoulder, a socket for removably receiving each lower end of the posts, said socket being adapted for mounting on a base member, a resilient brake member between one of said posts and the adjacent end of the roller, and means securing said posts against spreading on said journals and forcing the brake member into frictional engagement with said roller end and said post.

References Cited in the file of this patent

UNITED STATES PATENTS

| Number | Name | Date |
| --- | --- | --- |
| 855,903 | Packer | June 4, 1907 |
| 1,362,910 | Zoeller et al. | Dec. 21, 1920 |
| 1,499,920 | Godden | July 1, 1924 |
| 1,698,168 | Parsels | Jan. 8, 1929 |
| 1,995,640 | Hess et al. | Mar. 26, 1935 |
| 2,056,697 | Van Deest | Oct. 6, 1936 |
| 2,132,543 | Schofield | Oct. 11, 1938 |
| 2,173,298 | Gravenstine | Sept. 19, 1939 |
| 2,205,057 | Brady | June 18, 1940 |
| 2,412,120 | Bouchard | Dec. 3, 1946 |